United States Patent [19]

Ikeda et al.

[11] Patent Number: 5,407,880
[45] Date of Patent: Apr. 18, 1995

[54] CATALYSTS FOR ADSORPTION OF HYDROCARBONS

[75] Inventors: Takuya Ikeda, Zushi; Chiemi Hayashi, Yokohama; Tetsuo Ito, Fujisawa; Koji Masuda, Tokyo; Maki Kamikubo, Yokosuka, all of Japan

[73] Assignee: Nissan Motor Co., Ltd., Yokohama, Japan

[21] Appl. No.: 147,267

[22] Filed: Nov. 5, 1993

[30] Foreign Application Priority Data

Nov. 9, 1992 [JP] Japan .................................. 4-298934
Dec. 28, 1992 [JP] Japan .................................. 4-348906

[51] Int. Cl.6 ...................... B01J 29/06; B01J 29/068
[52] U.S. Cl. .................................. 502/67; 502/4; 502/87; 502/439; 502/527; 423/239.2
[58] Field of Search .................. 502/67; 423/239.2

[56] References Cited

U.S. PATENT DOCUMENTS 5,292,696  3/1994  Ito et al. ................................ 502/67

FOREIGN PATENT DOCUMENTS 58-20307   4/1983  Japan .
1171625
2-135126   5/1990  Japan .
3056139    3/1991  Japan ................................ 423/239.2
4267950    9/1992  Japan ................................ 423/239.2

Primary Examiner—Asok Pal
Attorney, Agent, or Firm—Lowe, Price, LeBlanc & Becker

[57] ABSTRACT

A catalyst for the adsorption of hydrocarbons is used in an apparatus for the purification of exhaust gas from an internal engine and comprises a honeycomb monolith carrier, a first layer of at least one zeolite having a different crystalline structure, a second layer containing at least one of Pt and Pd as a catalytic component, and a third layer containing Rh as a catalytic component.

4 Claims, No Drawings

CATALYSTS FOR ADSORPTION OF HYDROCARBONS

BACKGROUND OF THE INVENTION

1. Field of the Invention

This invention relates to a catalyst for the adsorption of hydrocarbons used in an apparatus for purifying exhaust gas from an internal combustion engine in automobiles and the like.

2. Description of the Related Art

As a catalyst for purifying the exhaust gas from the internal combustion engine, there are generally used catalysts simultaneously conducting oxidation of carbon monoxide (CO) and hydrocarbon (HC) and reduction of nitrogen oxides (NOx). Such a catalyst is generally formed by adding a noble metal such as Pd, Pt, Rh or the like and, if necessary, a rare earth metal such as Ce, La or the like or a base metal oxide of Ni or the like as a cocatalyst ingredient to an alumina coat layer formed on a refractory carrier as disclosed in Japanese Patent Application Publication No. 58-20307.

The above catalyst is strongly influenced by a temperature of exhaust gas and an air-fuel ratio set in the engine. In general, the temperature of exhaust gas is not lower than 300° C. for developing the purification performance through the catalyst, while the air-fuel ratio is near to theoretical air-fuel ratio (A/F=14.6) balancing the oxidation of HC and CO and the reduction of NOx for most effectively acting the catalyst. Therefore, an exhaust gas purifying device using the conventional three-way catalyst is arranged in an automobile so as to effectively serve the three-way catalyst, whereby the oxygen concentration of the exhaust system is detected to conduct feedback control for holding a fuel mixing ratio at about theoretical air-fuel ratio.

Even if the conventional three-way catalyst is disposed just behind an exhaust manifold, when the temperature of the exhaust gas is low immediately after the start of the engine (not higher than 300° C.), the catalyst activity is low and a great amount of HC discharged from the engine immediately after the engine start is discharged without purification.

In order to solve the above problem, there are proposed devices for the purification of exhaust gas in which HC trapper including an adsorbent for adsorbing cold HC is arranged in an upstream side of a catalyst convertor (Japanese Patent laid open No. 2-135126. That is, the adsorbent is comprised by carrying at least one catalytic metal on a monolith coated with zeolite.

In the HC adsorbent disclosed in Japanese Patent laid open No. 2-135126, however, there are problems that (1) since Y-type zeolite or mordenite is used as the zeolite, the HC adsorption ability is insufficient due to a great influence of water; (2) since noble metal is impregnated in a downstream side of the adsorbent, HC releases from an upstream side of the adsorbent before the catalyst reaches to an activity temperature; (3) since metal is carried after the coating of zeolite, the ion exchange is not sufficiently conducted and hence the adsorption ability becomes insufficient.

SUMMARY OF THE INVENTION

It is, therefore, an object of the invention to solve the aforementioned problem of the conventional technique and to provide a catalyst for the purification of hydrocarbons capable of well purifying HC within a range of from low temperature of exhaust gas at an engine start to a temperature developing the purification performance of the catalyst.

According to the invention, there is the provision of a catalyst for the adsorption of hydrocarbons, comprising a honeycomb carrier, a first layer formed on the carrier and comprised of at least one zeolite having a different crystalline structure effective for the adsorption of hydrocarbon, a second layer formed on the first layer and containing at least one of Pt and Pd as a catalytic component in powder consisting essentially of activated ceria and/or alumina, and a third layer formed on the second layer and containing Rh as a catalytic component.

In a preferable embodiment of the invention, a mixed powder of ZSM-5 zeolite and at least one of mordenite, USY and $\beta$-zeolite is used as the zeolite, or a mixed slurry of two or more ZMS-5 zeolites having different silica/alumina ratios is coated as the zeolite onto the honeycomb carrier. The mixed slurry is comprised of ZSM-5 zeolite having a silica/alumina ratio of more than 100 and ZSM-5 zeolite having a silica/alumina ratio of not more than 100.

DESCRIPTION OF PREFERRED EMBODIMENTS

In order to purify the exhaust gas from the internal engine, the catalyst for the purification of exhaust gas is widely used at the present. Many kinds of hydrocarbons are discharged in the exhaust gas from the automobile engine. Since the performance of purifying hydrocarbons among harmful components in the exhaust gas is strongly influenced by the temperature of the exhaust gas as previously mentioned, the hydrocarbons are not purified by the noble metal catalyst at a temperature of not higher than 300° C., and hence a great amount of hydrocarbons are discharged at the cold start of the engine. In order to remove the hydrocarbons discharged at the cold start, therefore, it is necessary to use an adsorbent for adsorbing the hydrocarbons. Zeolites are crystalline porous substances having uniform and fine pores and possess a property of selectively adsorbing only molecules capable of passing through the inlet of the pore, but the effective pore size differs in accordance with the kind of the zeolite. Therefore, the hydrocarbons discharged at the cold start are adsorbed by utilizing such a property of zeolite to thereby reduce HC in the exhaust gas at a temperature region causing no catalytic reaction.

According to the invention, two or more of zeolites having different crystalline structures such as pore size, pore form and the like, which are selected from mordenite, Y-type zeolite, USY, $\beta$-zeolite, ZSM-5 and so on, are pulverized and mixed at a constant mixing ratio to form a slurry and applied onto a monolith honeycomb carrier, whereby many kinds of hydrocarbons can be adsorbed to improve the adsorption ability for the hydrocarbon. Particularly, hydrophilic zeolite having a small adsorption ability at a low temperature side with a great amount of water such as Y-type zeolite, mordenite or the like is blended with zeolite being hardly affected by water such as ZSM-5 zeolite or the like, whereby the shape of the pores becomes complicated as compared with the use of single zeolite and is hardly affected by water and hence the adsorption ability for hydrocarbons is further improved. Moreover, the zeolite blend is applied onto the honeycomb carrier, so that the dispersibility of exhaust gas is improved and the synergistic action of two or more zeolites is effectively utilized.

Although HC adsorption ability of zeolite is dependent upon the temperature of exhaust gas, it is more improved by blending Pd/ZSM-5 zeolite having $SiO_2/Al_2O_3 \geqq 100$ with Pd/ZSM-5 zeolite having $SiO_2/Al_2O_3 < 100$. That is, ZSM-5 zeolite of $SiO_2/Al_2O_3 \geqq 100$ having an excellent adsorption ability at a low temperature side and a high hydrophobic nature can efficiently be exchanged with an ion of palladium (Pd) and hold the exchanged metal at a stable state in an active site of zeolite, which is blended with ZSM-5 zeolite of $SiO_2/Al_2O_3 < 100$ having an excellent adsorption ability even at a high temperature side at a constant mixing ratio and pulverized to form a slurry. When such a slurry is applied to the monolith carrier, since active sites having different influences of water are uniformly mixed in the carrier, there are existent active points in the complicated structure of zeolite and hence the adsorption ability is not changed even if the $H_2O$ content changes and is more improved without detaching from the carrier.

In the zeolite blend, it is desirable that one of the above two zeolites is used in an amount of not less than 10% at minimum. In order to well exist active sites in the mixed zeolite, the mixing ratio is favorable to be a range of 1:3 to 3:1.

Since many hydrocarbon molecules having different molecular sizes are existent in the actual exhaust gas, three kinds of zeolites having different pore sizes are preferable to be existent at a certain mixing ratio in order to reduce the whole amount of the discharged HC and adsorb hydrocarbons exhibiting a high ozone formation rate to thereby obtain a reduction effect of NMOG (non methane organic gas).

In this case, powder having an average particle size of about 0.5–3.0 μm is preferable to be used as zeolite in view of easiness of slurry preparation, coating property and the like.

In the hydrocarbon purification catalyst according to the invention, the second and third layers of the catalytic component formed on the first layer of zeolite is heated before the zeolite layer formed on the carrier, so that the catalyst layers are sufficiently activated at the stage of detaching HC from the zeolite layer, whereby HC is well purified.

In the second layer, Pt and Pd are high in the oxidation activity when being carried on active ceria and/or alumina. Particularly, Pt controls the poisoning of CO, so that it is preferably carried on the active ceria, while Pt bears high dispersibility, so that it is preferably carried on alumina. Furthermore, it is necessary that Ph is carried alone as a third layer in order to hold the heat resistance among catalytic properties.

The following examples are given in illustration of the invention and are not intended as limitations thereof. In these examples, part is by weight otherwise specified.

EXAMPLE 1

Into a porcelain pot are charged 100 parts of ZSM-5 zeolite (Si/Al mol ratio=30) ion-exchanged with Pd (hereinafter abbreviated as Pd/ZSM-5 zeolite), 65 parts of silica sol (solid content: 20%) and 65 parts of water, which are mixed and pulverized in an oscillation mill for 40 minutes or in a universal ball mill for 6.5 hours to prepare a slurry for wash coating. The thus obtained slurry is uniformly coated onto a monolith carrier of cordierite over a full section thereof and dried and calcined at 400° C. for about 1 hour. Thus, Pd/ZSM-5 zeolite is coated onto the carrier in an amount of about 90 g/l. By repeating the wash coating, drying and calcining, 130 g/l in total of Pd/ZSm-5 zeolite is coated and then the calcining is carried out in air at 650° C. for 2–6 hours (preferably 4 hours).

Separately, 100 parts of Pt-carried active ceria powder (hereinafter abbreviated as $Pt/CeO_2$), 50 parts of alumina and 150 parts of 2% nitric acid are charged into a porcelain pot to prepare a slurry for wash coating in the same manner as described above, which is coated on the Pd/ZSM-5 zeolite layer in an amount of 100 g/l, dried and calcined in air at 650° C. for 2–6 hours (preferably 4 hours).

Further, 100 parts of Rh-carried alumina powder (hereinafter abbreviated as $Rh/Al_2O_3$), 65 parts of silica sol (solid content: 20%) and 65 parts of water are charged into a porcelain pot to prepare a slurry for wash coating in the same manner as described above, which is coated onto the $Pt/CeO_2$ layer in an amount of 50 g/l, dried and calcined in air at 650° C. for 2–6 hours (preferably 4 hours) to obtain an adsorption catalyst 1.

EXAMPLE 2

Into a porcelain pot are charged 100 parts of ZSM-5 zeolite (Si/2Al=30) ion-exchanged with Cu (hereinafter abbreviated as Cu/ZSM-5 zeolite), 65 parts of silica sol (solid content: 20%) and 65 parts of water to prepare a slurry for wash coating in the same manner as in Example 1, which is coated onto a monolith carrier in an amount of 130 g/l, dried and calcined in air at 400° C. for 2–6 hours (preferably 4 hours).

Then, 100 g/l of $Pt/CeO_2$ is coated onto Cu/ZSM-5 zeolite layer, dried and calcined in the same manner as in Example 1.

Further, 50 g/l of $Rh/Al_2O_3$ is coated onto $Pt/CeO_2$ layer, dried and calcined in the same manner as in Example 1 to obtain an adsorption catalyst 2.

EXAMPLE 3

Into a porcelain pot are charged 50 parts of Pd/ZSM-5 zeolite (Si/2Al=30), 50 parts of Cu/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of $Pt/CeO_2$ is coated, dried and calcined in the same manner as in Example 1.

Further, 50 g/l of $Rh/Al_2O_3$ is coated, dried and calcined in the same manner as in Example 1 to obtain an adsorption catalyst 3.

EXAMPLE 4

Into a porcelain pot are charged 100 parts of Pd/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Separately, 100 parts of Pd-carried active ceria powder (hereinafter abbreviated as $Pd/CeO_2$), 50 parts of alumina and 150 parts of 2% nitric acid are charged into a porcelain pot to prepare a slurry for wash coating in the same manner as in Example 1, which is coated on the Pd/ZSM-5 zeolite layer in an amount of 100 g/l, dried and calcined in air at 650° C. for 2–6 hours (preferably 4 hours).

Further, 50 g/l of Rh/Al$_2$O$_3$ is coated, dried and calcined in the same manner as in Example 1 to obtain an adsorption catalyst 4.

EXAMPLE 5

Into a porcelain pot are charged 100 parts of Cu/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 4.

Further, 50 g/l of Rh/Al$_2$O$_3$ is coated, dried and calcined in the same manner as in Example 1 to obtain an adsorption catalyst 5.

EXAMPLE 6

Into a porcelain pot are charged 50 parts of Pd/ZSM-5 zeolite (Si/2Al=30), 50 parts of Cu/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pd/CeO$_2$ is coated, dried and calcined in the same manner as in Example 4.

Further, 50 g/l of Rh/Al$_2$O$_3$ is coated, dried and calcined in the same manner as in Example 1 to obtain an adsorption catalyst 6.

EXAMPLE 7

Into a porcelain pot are charged 100 parts of Pd/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Separately, 100 parts of Pt-carried alumina powder (hereinafter abbreviated as Pt/Al$_2$O$_3$ ), 50 parts of alumina and 150 parts of 2% nitric acid are charged into a porcelain pot to prepare a slurry for wash coating in the same manner as in Example 1, which is coated on the Pd/ZSM-5 zeolite layer in an amount of 100 g/l, dried and calcined in air at 650° C. for 2–6 hours (preferably 4 hours).

Further, 50 g/l of Rh/Al$_2$O$_3$ is coated, dried and calcined in the same manner as in Example 1 to obtain an adsorption catalyst 7.

EXAMPLE 8

Into a porcelain pot are charged 100 parts of Cu/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 7.

Further, 50 g/l of Rh/Al$_2$O$_3$ is coated, dried and calcined in the same manner as in Example 1 to obtain an adsorption catalyst 8.

EXAMPLE 9

Into a porcelain pot are charged 50 parts of Pd/ZSM-5 zeolite (Si/2Al=30), 50 parts of Cu/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pd/CeO$_2$ is coated, dried and calcined in the same manner as in Example 7.

Further, 50 g/l of Rh/Al$_2$O$_3$ is coated, dried and calcined in the same manner as in Example 1 to obtain an adsorption catalyst 9.

EXAMPLE 10

Into a porcelain pot are charged 100 parts of Pd/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Separately, 100 parts of Pd-carried alumina powder (hereinafter abbreviated as Pd/Al$_2$O$_3$), 50 parts of alumina and 150 parts of 2% nitric acid are charged into a porcelain pot to prepare a slurry for wash coating in the same manner as in Example 1, which is coated on the Pd/ZSM-5 zeolite layer in an amount of 100 g/l, dried and calcined in air at 650° C. for 2–6 hours (preferably 4 hours).

Further, 50 g/l of Rh/Al$_2$O$_3$ is coated, dried and calcined in the same manner as in Example 1 to obtain an adsorption catalyst 10.

EXAMPLE 11

Into a porcelain pot are charged 100 parts of Cu/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pd/Al$_2$O$_3$ is coated, dried and calcined in the same manner as in Example 10.

Further, 50 g/l of Rh/Al$_2$O$_3$ is coated, dried and calcined in the same manner as in Example 1 to obtain an adsorption catalyst 11.

EXAMPLE 12

Into a porcelain pot are charged 50 parts of Pd/ZSM-5 zeolite (Si/2Al=30), 50 parts of Cu/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pd/Al$_2$O$_3$ is coated, dried and calcined in the same manner as in Example 10.

Further, 50 g/l of Rh/Al$_2$O$_3$ is coated, dried and calcined in the same manner as in Example 1 to obtain an adsorption catalyst 12.

EXAMPLE 13

Into a porcelain pot are charged 100 parts of Pd/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Separately, 50 parts of Pt/CeO$_2$, 50 parts of Pd/Al$_2$O$_3$, 50 parts of alumina and 150 parts of 2% nitric acid are charged into a porcelain pot to prepare a slurry for wash coating in the same manner as in Example 1, which is coated on the Pd/ZSM-5 zeolite layer in an amount of 100 g/l (Pt+Pd), dried and calcined in air at 650° C. for 2-6 hours (preferably 4 hours).

Further, 50 g/l of Rh/Al$_2$O$_3$ is coated, dried and calcined in the same manner as in Example 1 to obtain an adsorption catalyst 13.

EXAMPLE 14

Into a porcelain pot are charged 100 parts of Cu/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l in total of Pt/CeO$_2$ and Pd/Al$_2$O$_3$ is coated, dried and calcined in the same manner as in Example 13.

Further, 50 g/l of Rh/Al$_2$O$_3$ is coated, dried and calcined in the same manner as in Example 1 to obtain an adsorption catalyst 14.

EXAMPLE 15

Into a porcelain pot are charged 50 parts of Pd/ZSM-5 zeolite (Si/2Al=30), 50 parts of Cu/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ and Pd/Al$_2$O$_3$ is coated, dried and calcined in the same manner as in Example 13.

Further, 50 g/l of Rh/Al$_2$O$_3$ is coated, dried and calcined in the same manner as in Example 1 to obtain an adsorption catalyst 15.

EXAMPLE 16

Into a porcelain pot are charged 50 parts of H-type ZSM-5 zeolite (Si/2Al=30), 50 parts of H-type USY zeolite (Si/2Al=13), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 16.

EXAMPLE 17

Into a porcelain pot are charged 50 parts of H-type ZSM-5 zeolite (Si/2Al=30), 50 parts of H-type β-zeolite (Si/2Al=40), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 17.

EXAMPLE 18

Into a porcelain pot are charged 50 parts of H-type ZSM-5 zeolite (Si/2Al=30), 50 parts of H-type mordenite (Si/2Al=80), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 18.

EXAMPLE 19

Into a porcelain pot are charged 50 parts of H-type ZSM-5 zeolite (Si/2Al=30), 50 parts of H-type ZSM-5 zeolite (Si/2Al=700), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 19.

EXAMPLE 20

Into a porcelain pot are charged 50 parts of Pd/ZSM-5 zeolite (Si/2Al=30), 50 parts of H-type USY zeolite (Si/2Al=13), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 20.

EXAMPLE 21

Into a porcelain pot are charged 50 parts of Pd/ZSM-5 zeolite (Si/2Al=30), 50 parts of H-type β-zeolite (Si/2Al=40), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 21.

EXAMPLE 22

Into a porcelain pot are charged 50 parts of Pd/ZSM-5 zeolite (Si/2Al=30), 50 parts of H-type mordenite (Si/2Al=80), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 22.

EXAMPLE 23

Into a porcelain pot are charged 50 parts of Pd/ZSM-5 zeolite (Si/2Al=30), 50 parts of H-type ZSM-5 zeolite (Si/2Al=700), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 23.

EXAMPLE 24

Into a porcelain pot are charged 50 parts of Cu/ZSM-5 zeolite (Si/2Al=30), 50 parts of H-type USY zeolite (Si/2Al=13), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 24.

EXAMPLE 25

Into a porcelain pot are charged 50 parts of Cu/ZSM-5 zeolite (Si/2Al=30), 50 parts of H-type $\beta$-zeolite (Si/2Al=40), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 25.

EXAMPLE 26

Into a porcelain pot are charged 50 parts of Cu/ZSM-5 zeolite (Si/2Al=30), 50 parts of H-type mordenite (Si/2Al=80), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 26.

EXAMPLE 27

Into a porcelain pot are charged 50 parts of Cu/ZSM-5 zeolite (Si/2Al=30), 50 parts of H-type ZSM-5 zeolite (Si/2Al=700), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 27.

EXAMPLE 28

Into a porcelain pot are charged 50 parts of Pd/ZSM-5 zeolite (Si/2Al=30), 25 parts of H-type USY zeolite (Si/2Al=13), 25 parts of H-type $\beta$-zeolite (Si/2Al=40), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 28.

EXAMPLE 29

Into a porcelain pot are charged 50 parts of Pd/ZSM-5 zeolite (Si/2Al=30), 25 parts of H-type USY zeolite (Si/2Al=13), 25 parts of H-type mordenite (Si/2Al=80), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 29.

EXAMPLE 30

Into a porcelain pot are charged 50 parts of Pd/ZSM-5 zeolite (Si/2Al=30), 25 parts of H-type $\beta$-zeolite (Si/2Al=80), 25 parts of H-type mordenite (Si/2Al=80), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 30.

EXAMPLE 31

Into a porcelain pot are charged 50 parts of Pd/ZSM-5 zeolite (Si/2Al=30), 25 parts of H-type ZSM-5 zeolite (Si/2Al=700), 25 parts of H-type USY zeolite (Si/2Al=13), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 31.

EXAMPLE 32

Into a porcelain pot are charged 50 parts of Pd/ZSM-5 zeolite (Si/2Al=30), 25 parts of H-type ZSM-5 zeolite (Si/2Al=700), 25 parts of H-type β-zeolite (Si/2Al=40), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 32.

EXAMPLE 33

Into a porcelain pot are charged 50 parts of Pd/ZSM-5 zeolite (Si/2Al=30), 50 parts of Pd/USY zeolite (Si/2Al=13), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 33.

EXAMPLE 34

Into a porcelain pot are charged 50 parts of Pd/ZSM-5 zeolite (Si/2Al=30), 50 parts of Pd/β-zeolite (Si/2Al=40), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 34.

EXAMPLE 35

Into a porcelain pot are charged 50 parts of Pd/ZSM-5 zeolite (Si/2Al=30), 50 parts of Pd/mordenite (Si/2Al=80), 65 parts of silica sol (solid content: 20) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 35.

EXAMPLE 36

Into a porcelain pot are charged 50 parts of Pd/ZSM-5 zeolite (Si/2Al=30), 50 parts of Pd/ZSM-5 zeolite (Si/2Al=700), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1.

Then, 100 g/l of Pt/CeO$_2$ is coated, dried and calcined in the same manner as in Example 1.

Further, 50 g/l of Rh/Al$_2$O$_3$ is coated, dried and calcined in the same manner as in Example 1 to obtain an adsorption catalyst 36.

EXAMPLE 37

Into a porcelain pot are charged 50 parts of Pd/ZSM-5 zeolite (Si/2Al=30), 50 parts of H-type USY zeolite (Si/2Al=13), 65 parts of silica sol (solid content: 20%) and 65 parts of water to prepare a slurry for wash coating in the same manner as in Example 20, which is coated onto a monolith carrier in an amount of 130 g/l, dried and calcined in the same manner as in Example 1.

Then, 100 g/l of Pt/CeO$_2$ was coated, dried and calcined in the same manner as in Example 1.

Furthermore, 50 g/l of Rh/Al$_2$O$_3$ was coated, dried and calcined in the same manner as in Example 1 to obtain an adsorption catalyst 37.

EXAMPLE 38

Into a porcelain pot are charged 50 parts of Pd/ZSM-5 zeolite (Si/2Al=30), 50 parts of H-type β-zeolite (Si/2Al=40), 65 parts of silica sol (solid content: 20%) and 65 parts of water to prepare a slurry for wash coating in the same manner as in Example 21, which is coated onto a monolith carrier in an amount of 130 g/l, dried and calcined in the same manner as in Example 1.

Then, 100 g/l of Pt/CeO$_2$ was coated, dried and calcined in the same manner as in Example 1.

Furthermore, 50 g/l of Rh/Al$_2$O$_3$ was coated, dried and calcined in the same manner as in Example 1 to obtain an adsorption catalyst 38.

EXAMPLE 39

Into a porcelain pot are charged 50 parts of Pd/ZSM-5 zeolite (Si/2Al=30), 50 parts of H-type mordenite (Si/2Al=80), 65 parts of silica sol (solid content: 20%) and 65 parts of water to prepare a slurry for wash coating in the same manner as in Example 22, which is coated onto a monolith carrier in an amount of 130 g/l, dried and calcined in the same manner as in Example 1.

Then, 100 g/l of Pt/CeO$_2$ was coated, dried and calcined in the same manner as in Example 1.

Furthermore, 50 g/l of Rh/Al$_2$O$_3$ was coated, dried and calcined in the same manner as in Example 1 to obtain an adsorption catalyst 39.

EXAMPLE 40

Into a porcelain pot are charged 50 parts of Pd/ZSM-5 zeolite (Si/2Al=30), 50 parts of H-type ZSM-5 zeolite (Si/2Al=700), 65 parts of silica sol (solid content: 20%) and 65 parts of water to prepare a slurry for wash coating in the same manner as in Example 23, which is coated onto a monolith carrier in an amount of 130 g/l, dried and calcined in the same manner as in Example 1.

Then, 100 g/l of Pt/CeO$_2$ was coated, dried and calcined in the same manner as in Example 1.

Furthermore, 50 g/l of Rh/Al$_2$O$_3$ was coated, dried and calcined in the same manner as in Example 1 to obtain an adsorption catalyst 40.

Comparative Example 1

Into a porcelain pot are charged 100 parts of H-type ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1 to obtain an adsorption catalyst 41.

Comparative Example 2

Into a porcelain pot are charged 100 parts of Pd/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1 to obtain an adsorption catalyst 42.

Comparative Example 3

Into a porcelain pot are charged 100 parts of Cu/ZSM-5 zeolite (Si/2Al=30), 65 parts of silica sol (solid content: 20%) and 65 parts of water to prepare a slurry for wash coating in the same manner as in Example 1, which is coated onto a monolith carrier in an amount of 130 g/l, dried and calcined in the same manner as in Example 1 to obtain an adsorption catalyst 43.

Test Example 1

After each of the adsorption catalysts of Examples 1-15 and 37-40 and Comparative Examples 1-3 is mounted on a vehicle of 2000 cc in displacement, HC purification ratio is measured for 250 seconds after the state of engine under LA4-CH mode to obtain results as shown in Table 1.

TABLE 1

| Adsorption catalyst | HC purification ratio (%) | Remarks |
| --- | --- | --- |
| 1 | 43 | Example 1 |
| 2 | 41 | Example 2 |
| 3 | 45 | Example 3 |
| 4 | 40 | Example 4 |
| 5 | 39 | Example 5 |
| 6 | 40 | Example 6 |
| 7 | 39 | Example 7 |
| 8 | 37 | Example 8 |
| 9 | 38 | Example 9 |
| 10 | 44 | Example 10 |
| 11 | 43 | Example 11 |
| 12 | 47 | Example 12 |
| 14 | 45 | Example 13 |
| 14 | 45 | Example 14 |
| 15 | 49 | Example 15 |
| 37 | 60 | Example 37 |
| 38 | 59 | Example 38 |
| 39 | 51 | Example 39 |
| 40 | 51 | Example 40 |
| 41 | 9 | Comparative Example 1 |
| 42 | 10 | Comparative Example 2 |
| 43 | 9 | Comparative Example 3 |

Test Example 2

After each of the adsorption catalysts of Examples 16-36 and Comparative Examples 1-3 is mounted on a vehicle of 2000 cc in displacement, HC purification ratio is measured for 60 seconds after the state of engine under LA4-CH mode to obtain results as shown in Table 2.

TABLE 2

| Adsorption catalyst | HC purification ratio (%) | Remarks |
| --- | --- | --- |
| 16 | 52 | Example 16 |
| 17 | 53 | Example 17 |
| 18 | 43 | Example 18 |
| 19 | 44 | Example 19 |
| 20 | 58 | Example 20 |
| 21 | 58 | Example 21 |
| 22 | 47 | Example 22 |
| 23 | 45 | Example 23 |
| 24 | 52 | Example 24 |
| 25 | 52 | Example 25 |
| 26 | 45 | Example 26 |
| 27 | 44 | Example 27 |
| 28 | 60 | Example 28 |
| 29 | 58 | Example 29 |
| 30 | 54 | Example 30 |
| 31 | 61 | Example 31 |
| 32 | 60 | Example 32 |
| 33 | 52 | Example 33 |
| 34 | 54 | Example 34 |
| 35 | 45 | Example 35 |
| 36 | 44 | Example 36 |
| 41 | 35 | Comparative Example 1 |
| 42 | 37 | Comparative Example 2 |
| 43 | 35 | Comparative Example 3 |

As mentioned above, according to the invention, two or more zeolites having different crystalline structures such as pore size, pore shape and the like are coated onto a monolith carrier at a given mixing ratio, whereby many kinds of hydrocarbons can sufficiently be adsorbed from the exhaust gas under a condition containing a great amount of water immediately after the engine start. Furthermore, the second and third catalyst layers are formed on the zeolite layer, whereby the hydrocarbons can be adsorbed under conditions ranging from low temperature to high temperature of the exhaust gas.

What is claimed is:

1. A catalyst for the adsorption of hydrocarbons, comprising a honeycomb carrier, a first layer formed on the carrier and comprised of at least one zeolite having a different crystalline structure effective for the adsorption of hydrocarbon, a second layer formed on the first layer and containing at least one of Pt and Pd as a catalytic component in powder consisting essentially of activated ceria and/or alumina, and a third layer formed on the second layer and containing Rh as a catalytic component.

2. The catalyst according to claim 1, wherein a mixed powder of ZSM-5 zeolite and at least one of mordenite, USY and β-zeolite is used as the zeolite.

3. The catalyst according to claim 1, wherein a mixed slurry of two or more ZMS-5 zeolites having different silica/alumina ratios is coated as the zeolite onto the honeycomb carrier.

4. The catalyst according to claim 3, wherein said mixed slurry is comprised of ZSM-5 zeolite having a silica/alumina ratio of more than 100 and ZSM-5 zeolite having a silica/alumina ratio of not more than 100.

* * * * *